United States Patent [19]

Perine et al.

[11] Patent Number: 5,832,193

[45] Date of Patent: Nov. 3, 1998

[54] METHOD AND APPARATUS FOR PRINTING A LABEL ON THE SPINE OF A BOUND DOCUMENT

[75] Inventors: Peter W. Perine, Victor; Randall R. Hube, Rochester, both of N.Y.

[73] Assignee: Xerox Corporation, Stamford, Conn.

[21] Appl. No.: 621,269

[22] Filed: Mar. 25, 1996

[51] Int. Cl.$^6$ .................................................. G06K 15/00

[52] U.S. Cl. .......................................... 395/117; 395/106

[58] Field of Search ..................................... 395/101, 117, 395/106; 347/2–4, 104, 105, 106, 107; 400/24, 25, 27, 28; 399/361, 362, 367

[56] References Cited

U.S. PATENT DOCUMENTS

| | | | |
|---|---|---|---|
| 4,768,766 | 9/1988 | Berger et al. | 400/126 |
| 5,724,075 | 3/1998 | Smith | 347/2 |

FOREIGN PATENT DOCUMENTS 0 678 392 A2  10/1995  European Pat. Off. .

OTHER PUBLICATIONS

Alan Simpson, Mastering Word Perfect 5.1 & 5.2 p. 696, 1993.

*Primary Examiner*—Arthur G. Evans
*Attorney, Agent, or Firm*—Gary B. Cohen

[57] ABSTRACT

A printing system for printing a representation of an image on a first portion of a bound document with the image being disposed on a second portion of the bound document is provided. The printing system includes an input station for generating a print job including the image, and a printing machine, communicating with said input station, for producing prints corresponding with the job, wherein one of the prints includes the image as a printed image. The printing system further includes a spine printing apparatus including an image capture system for reading the printed image and converting the same to a set of image data; and a printing device for printing the representation of the image, by reference to the set of image data, on the first portion of the bound document.

4 Claims, 11 Drawing Sheets

METHOD AND APPARATUS FOR PRINTING A LABEL ON THE SPINE OF A BOUND DOCUMENT

BACKGROUND OF THE INVENTION

The present invention relates generally to a technique for labeling a bound document and, more particularly, to a printing system, including a spine printing device, for scanning an image on the bound document to print a representation of the image on the spine of the bound document.

Electronic printing systems typically include an input section, often referred to as an input image terminal ("IIT"), a controller, often referred to as an electronic subsystem ("ESS") and an output section or print engine, often referred to as an image output terminal ("IOT"). In one type of electronic printing system, manufactured by Xerox® Corporation, known as the DocuTech® electronic printing system, an electronic master or job can be inputted to the IIT from, among other sources, a network or a scanner. An example of an IIT with both network and scanner inputs is found in the following patent:

U.S. Pat. No. 5,170,340

Patentees: Prokop et al.

Issued: Dec. 8, 1992

Electronic printing systems of the type disclosed in U.S. Pat. No. 5,170,340 are particularly well suited for "print-on-demand" applications in which the electronic job can be both created and stored, in one instance, for printing of multiple print sets over multiple times. This print-on-demand functionality makes electronic printing systems particularly well suited for print shop applications in which high speed commercial printing is required.

In a high speed commercial printing system of the foregoing type, the copy sheets with the information permanently affixed thereto, are transported to a finishing station. After the requisite number of sheets, corresponding to a set of original documents is compiled in the finishing station, the copies of the set are permanently affixed to one another to form a booklet thereof. In one example, the sheets are adhesively bound to one another. In order for each set of copy sheets to have a bound finished appearance, it is desirable to adhesively secure the sheets of the set to one another. More particularly, the copy sheets are collected and adhesive is applied to a spine to bind the sheets together into sets of copy sheets. The adhesively bound sets of copy sheets are then stacked for presentation to a machine operator.

A technique for adhesively binding sets of finished copy sheets can be found in the following patent:

U.S. Pat. No. 4,828,645

Patentee: VanBortel

Issued: May 9, 1989

U.S. Pat. No. 4,828,645 discloses an apparatus which adhesively binds a set of sheets by applying a strip, having an adhesive on one surface thereof, to a spine of the set. The strip is supported on a heated platen which softens the adhesive. The spine of the set of copy sheets is pressed into the adhesive on the strip. The depth of penetration of the spine into the adhesive is controlled so as to form an adhesive layer, of predetermined thickness, between the spine and the strip.

The disclosures of the above-mentioned patents are incorporated herein by reference.

As is known, an adhesively bound set, referred to hereinafter as "bound document", commonly includes a front cover coupled with a back cover by a strip of binding tape, the strip of binding tape being disposed along the bound document spine. In stacking the bound documents, either vertically or horizontally, it is necessary to label the spine of a given bound document if that given bound document is to be easily identified by a user. A system well suited for labeling the spine of a bound document is disclosed in the following published patent application:

European Application No. 0 678 392 A2 (Ink Jet Printing System for Book Spines)

Applicant: Smith

Publication Date: Oct. 25, 1995

European Application No. 0 678 392 A2 discloses a system that prints onto the spine of a book including spines covered by thermal adhesive binding tape, and includes a thermal ink jet printer having a printhead configured and positioned to print on the spine of books. The ink jet printer has a book support that facilitates the positioning of a book adjacent the printhead. Imaging by the printhead onto the spine of the book is controlled by a computer with appropriate software. An adjustment device is connected to the printhead for controlling the positioning of the printhead with respect to the spine of the book in order to compensate for the size of font and thickness of the book.

The above-described system for printing labels on bound document spines is well suited for its intended purpose; however, the cost associated with such system may be relatively high since it requires, among other components, a computer and appropriate software. Moreover, operation of the device may require a certain degree of user facility in that printhead adjustment is required. In some instances, a user may wish to label the bound document with a relatively inexpensive device that requires little or no printhead adjustment. It would be desirable to provide a simple spine labeling system that is constructed with inexpensive components and easy to use.

SUMMARY OF THE INVENTION

In accordance with one aspect of the present invention, there is provided a printing system for printing a representation of an image on a first portion of a bound document with the image being disposed on a second portion of the bound document. The printing system includes: an input station for generating a print job including the image; a printing machine, communicating with said input station, for producing prints corresponding with the job, wherein one of the prints includes the image as a printed image; an image capture system for reading the printed image and converting the same to a set of image data; and a printing device for printing the representation of the image, by reference to the set of image data, on the first portion of the bound document.

In accordance with another aspect of the present invention there is provided a printing apparatus for printing a representation of an image on a first portion of a bound document with the image being disposed on a second portion of the bound document. The printing apparatus includes: an image capture subsystem, with one or more image reading elements, for reading the image as the bound document is scanned with said one or more image reading elements; and a printing subsystem, with one or more printing elements, positioned relative to said image capture subsystem, so that as the bound document is read by said image capture subsystem, one or more image portions of the image are captured with the one or more image reading elements of said image capture subsystem and, in response to said scanning of the image, the reproduction of the image is printed with said one or more printing elements on the first portion of the bound document.

BRIEF DESCRIPTION OF THE DRAWINGS

Other features of the present invention will become apparent as the following description proceeds and upon reference to the drawings, in which.

DETAILED DESCRIPTION OF THE EMBODIMENTS

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
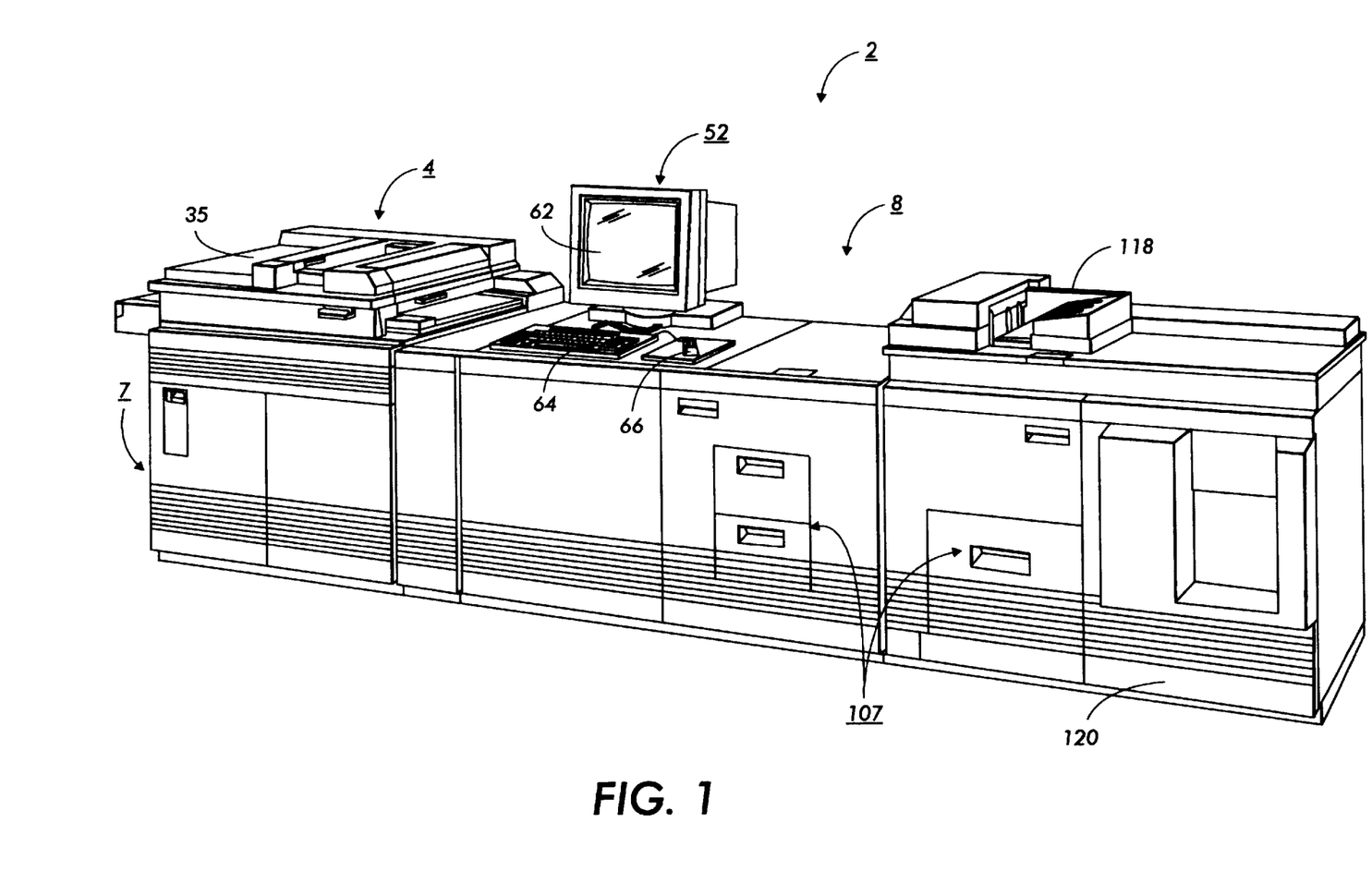
FIG. 1 is a view depicting an electronic printing system appropriate for producing a set of prints to be used in creating a bound document.
Figure 2:
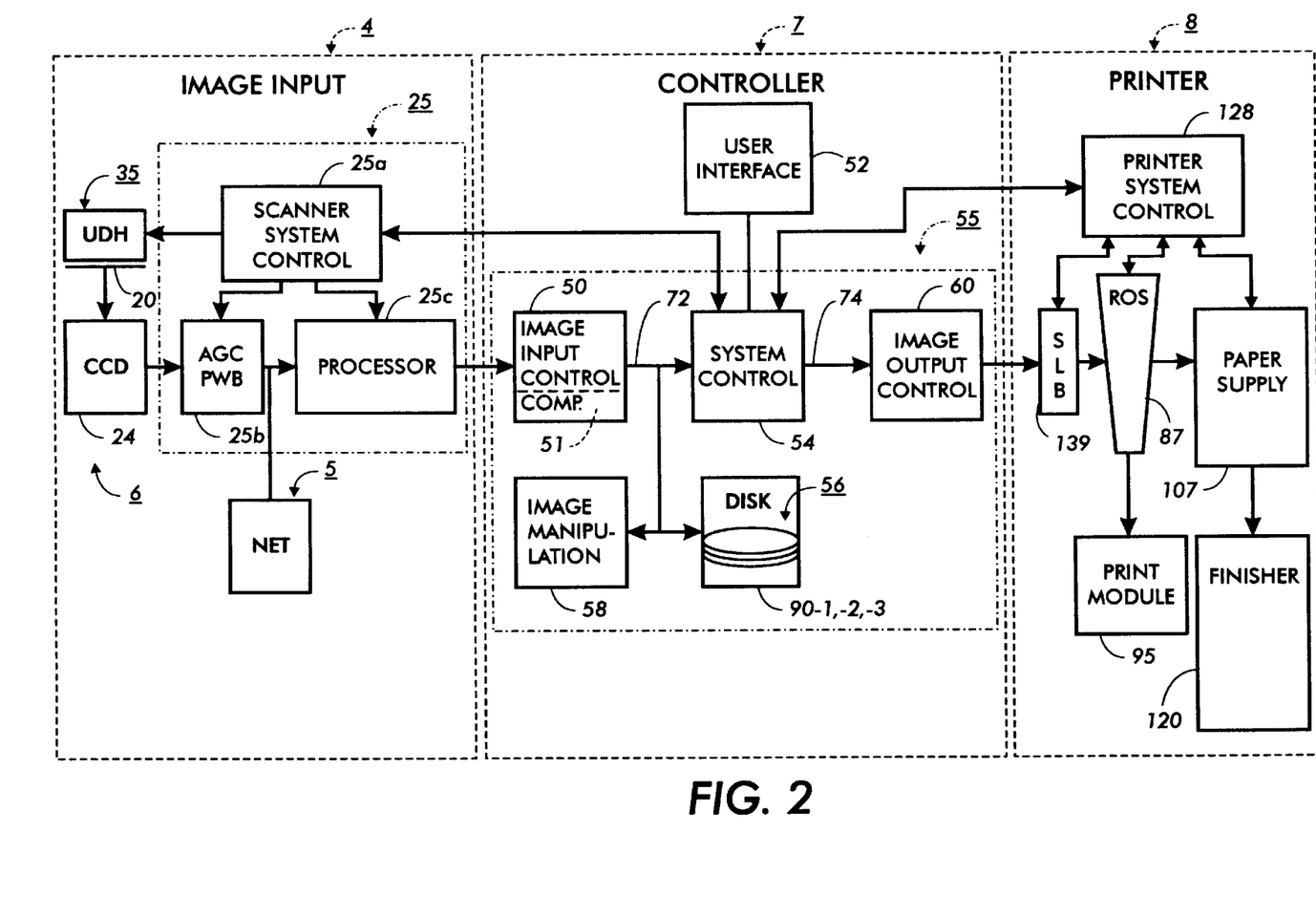
FIG. 2 is a block diagram depicting the major elements of the printing system shown in FIG. 1.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

For off-site image input, image input section 4 has a network 5 with a suitable communication channel such as an EtherNet® connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned.

For on-site image input, section 4 has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 128. ROS 87 has a two beam laser with the beams modulated in accordance with the content of an image signal input by acousto-optic modulator to provide dual imaging beams which are scanned across a moving photoreceptor of Print Module 95 by means of a rotating polygon. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 128 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multi-processor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3) pending transfer to main memory 56 when the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point cursor 67 (seen in FIG. 6) to the item selected and keying the mouse.

Main memory 56 (FIG. 2) has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Figure 3:
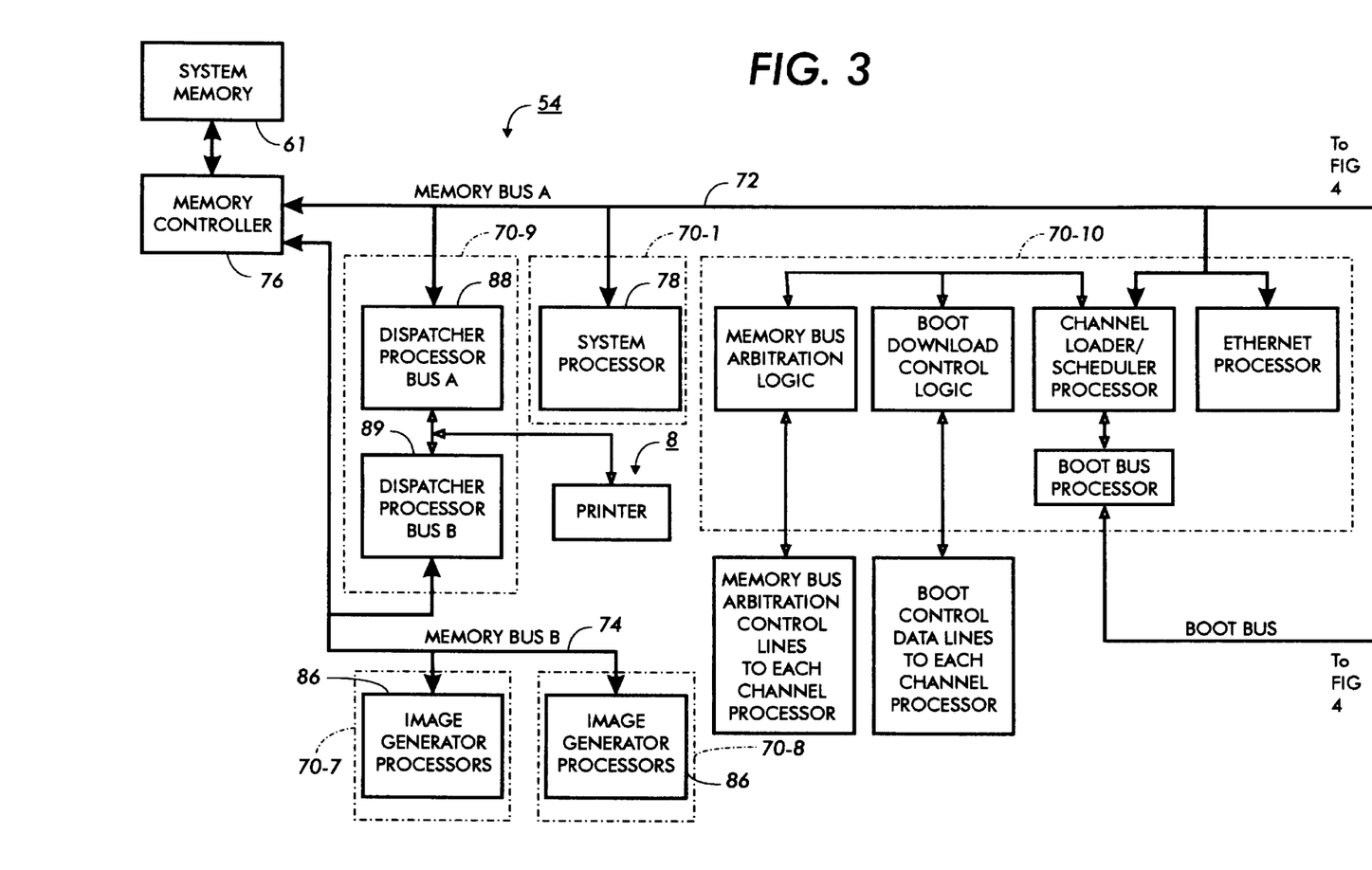
FIGS. 3–5 comprise a schematic block diagram showing the major parts of the control section for the printing system shown in FIG. 1.
Figure 4:
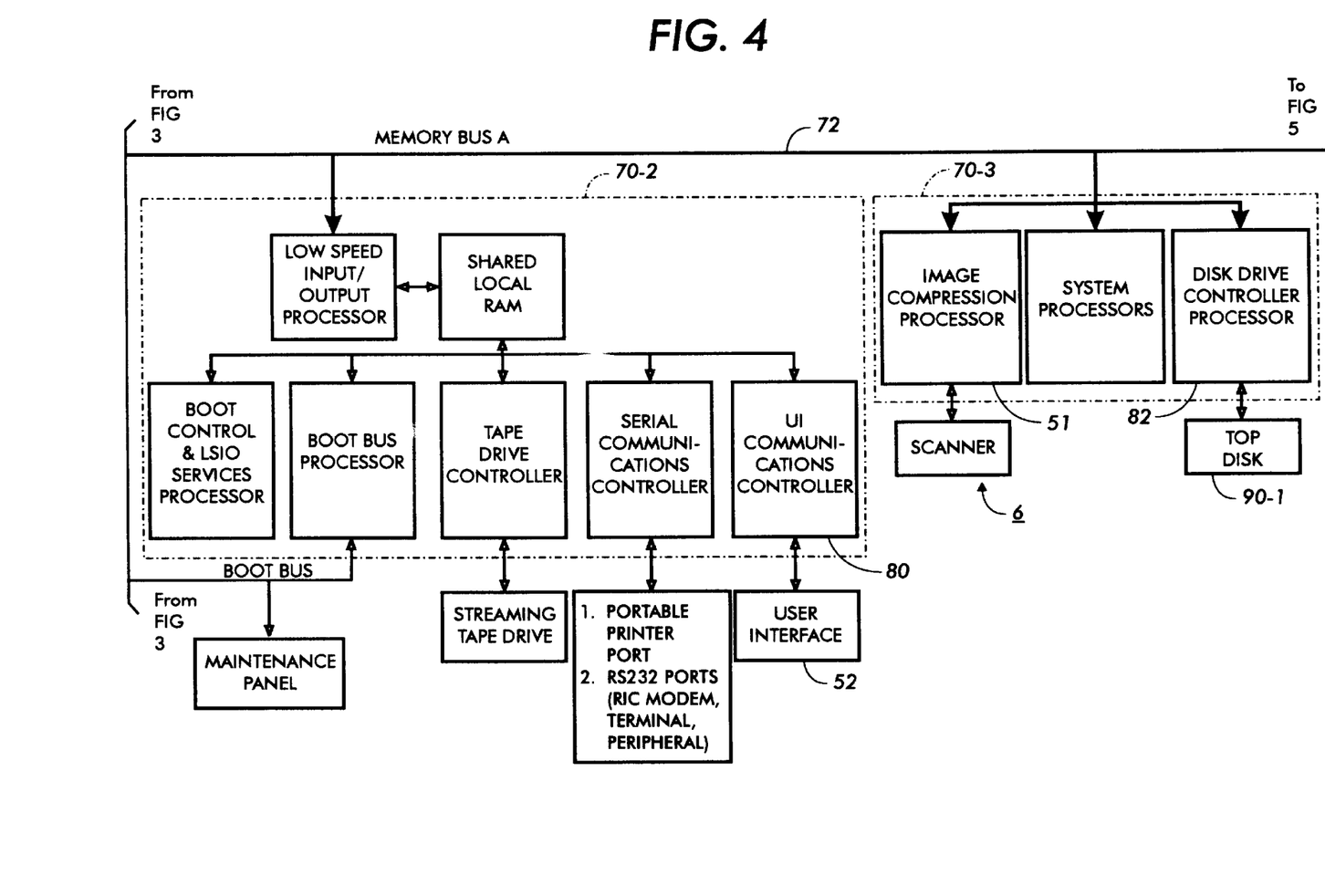
Figure 5:
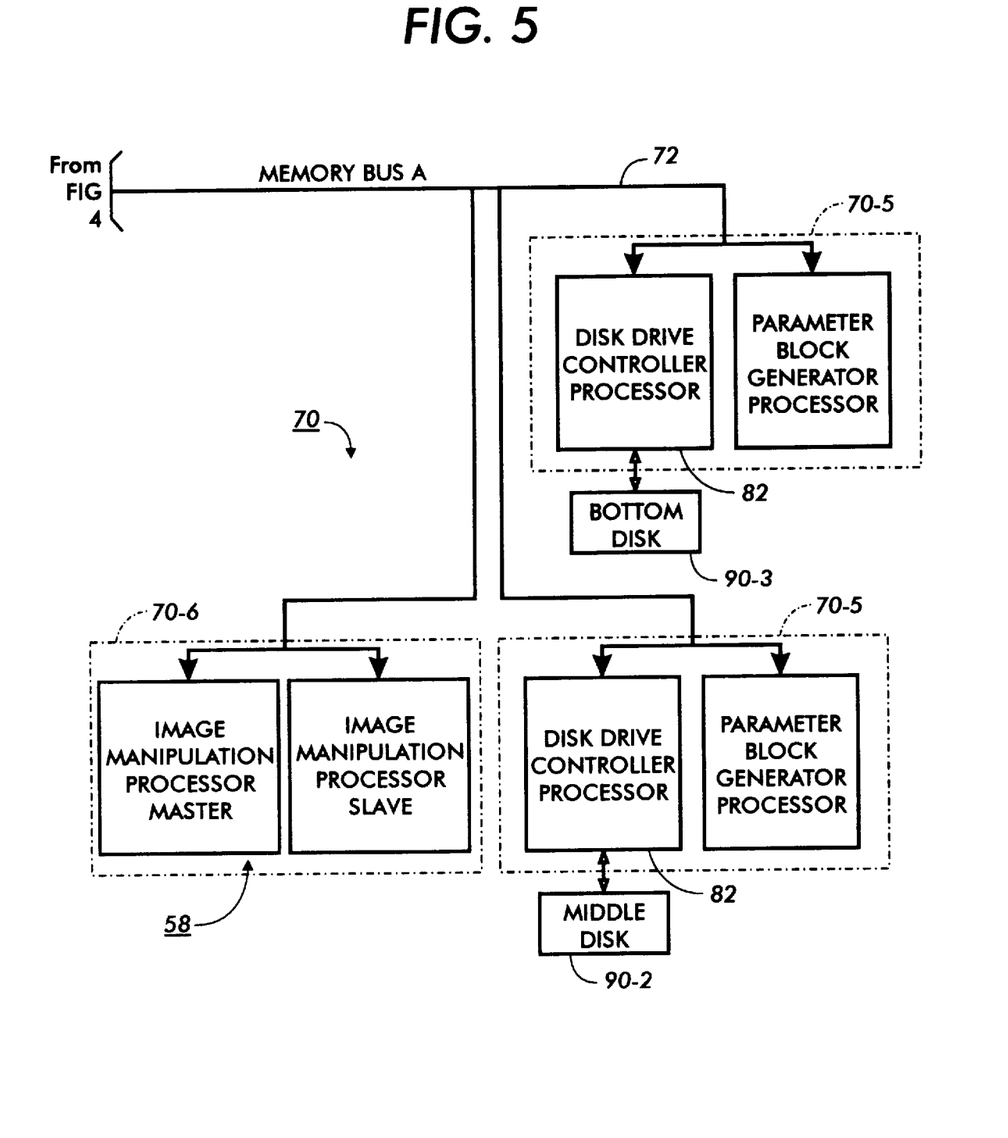

Referring particularly to FIGS. 3–5, image data output to image output control 60 is decompressed and readied for printing by image generating processors 86 of PWBs 70-7, 70-8. Following this, the data is output by dispatch processors 88, 89 on PWB 70-9 via Scan Line Buffer (SLB) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3A–3C), PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed 1/0 processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Figure 6:
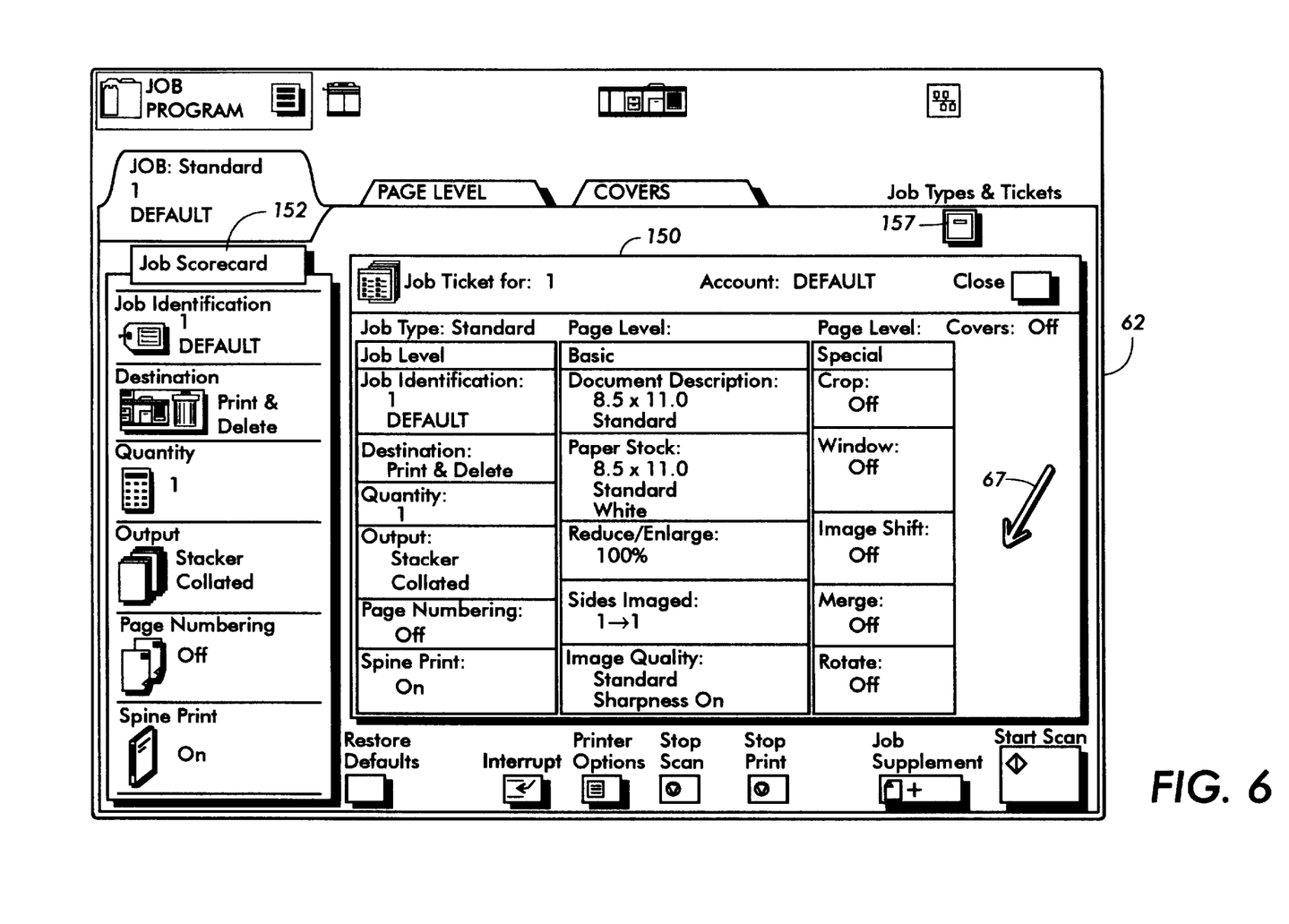
FIG. 6 is a view depicting an exemplary job programming ticket and job scorecard displayed on the User Interface (UI) touchscreen of the printing system shown in FIG. 1, the job ticket and job scorecard being associated with a job to be printed.

Referring to FIG. 6, jobs are programmed in a Job Program mode in which there is displayed on touchscreen 62 a Job Ticket 150 and a Job Scorecard 152 for the job being programmed. Job Ticket 150 displays various job selections available for programming, while Job Scorecard 152 displays the basic instructions to the system for printing the job. Various Job Ticket types are provided, with access by means of Job Types and Tickets icon 157. The exemplary job ticket of FIG. 6 includes a spine printing programming option, the significance of which will appear from the description below.

Job Tickets 150 have three programming levels, referred to as "Job Level", "Basic", and "Special", each having a series of icons for accessing the various programmning selections available at that level. Each programming level has a Scorecard 152 associated with it so that on activation of a particular job level or of a specific icon, the appropriate Scorecard is displayed on touchscreen 62.

As described, print jobs may be derived from multiple sources, i.e., jobs scanned in using scanner 6 for printing; jobs scanned in, stored, and then edited or added to for printing later; jobs remotely scanned in and submitted to the system as, for example, through net 5 (FIG. 2); jobs remotely developed and then submitted to the system for printing, etc.

Figure 7:
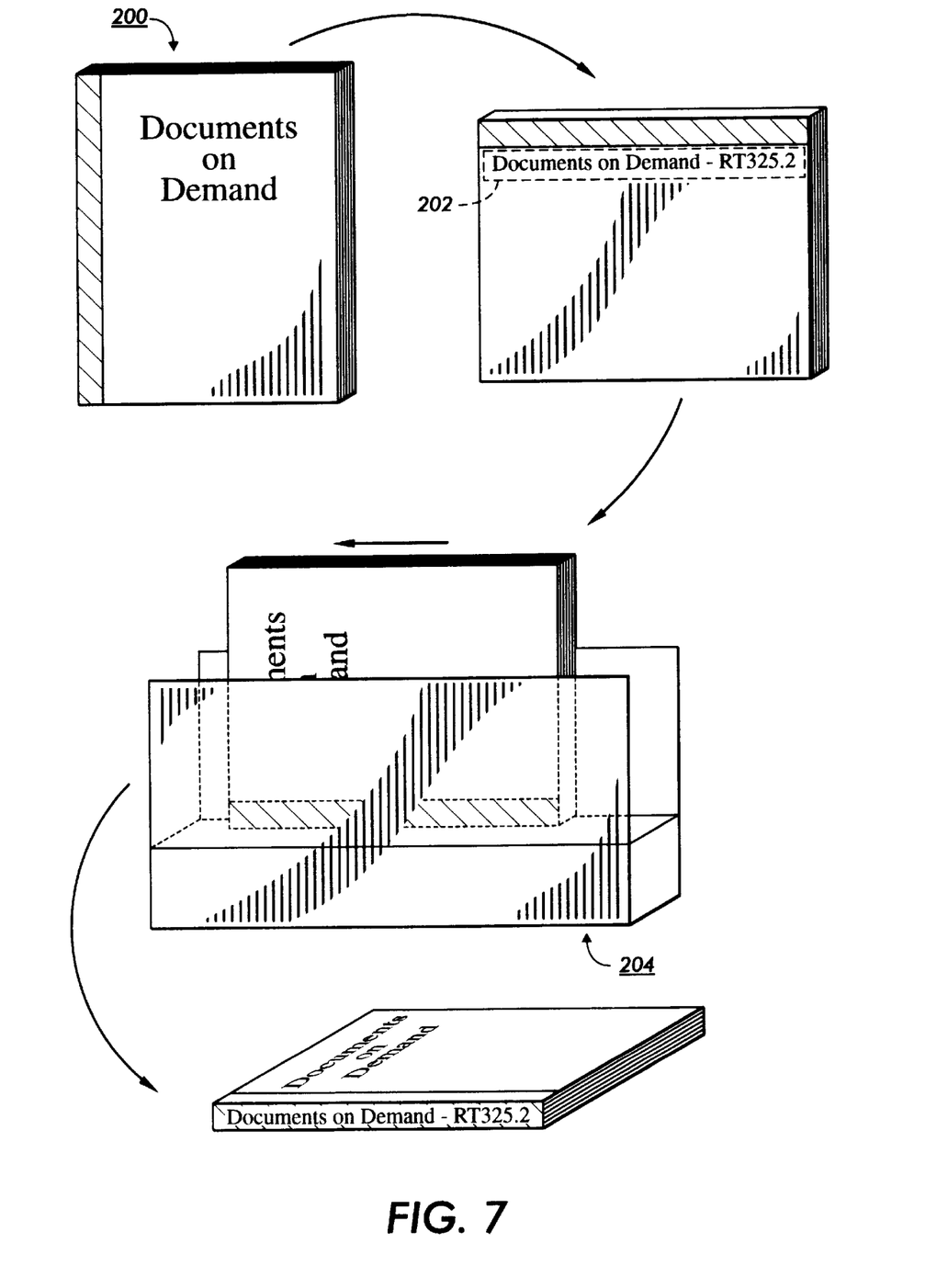
FIG. 7 is a perspective view demonstrating an aspect of the disclosed invention in which the bound document is scanned by a spine printing apparatus for printing a representation of cover label image on the spine of the bound document.

Referring to FIG. 7, a general overview of one aspect of the preferred embodiment is discussed. As shown, a bound document 200, with a cover label image ("Image2") 202 on the back cover, is passed through a spine printing apparatus 204-Image2 has its source, for example, in a memory directory of the type disclosed in U.S. Pat. No. 5,384,886 to Rourke, the disclosure of which is incorporated herein by reference. As a result of such passing, the cover label image 202 is read by a suitable image capture device (shown and discussed below) and a representation of the cover label image is printed with a printhead (shown and discussed below) on a spine portion of the bound document 200. It will appear that the disclosed embodiment is adaptable for printing representations of cover label images located at positions on the bound document other than the back portion.

It should be recognized that printing of the cover label image reproduction ("Image1") is less than desirable when Image2 is not configured to fit within the confines of the bound document spine. To optimize the printing of Image1 on the bound document spine, an exemplary process, shown in FIG. 8, follows below. Preferably, the process of FIG. 8 is performed on an electronic reprographic system of the type described in conjunction with FIGS. 1–6.

As will be appreciated by those skilled in the art, Image2 could assume the form of machine readable code (e.g. bar code or glyph) and subsequently be decoded at the spine printing apparatus 204, in accordance with the methodology described below, for purposes of labeling the spine portion of bound document 200. Examples of arrangements in which glyphs are decoded for use in producing images are disclosed by U.S. Pat. No. 5,168,147 to Bloomberg and U.S. Pat. No. 5,486,686 to Zdybel, Jr., et al., the disclosures of which patents are incorporated herein by reference.

Figure 8:
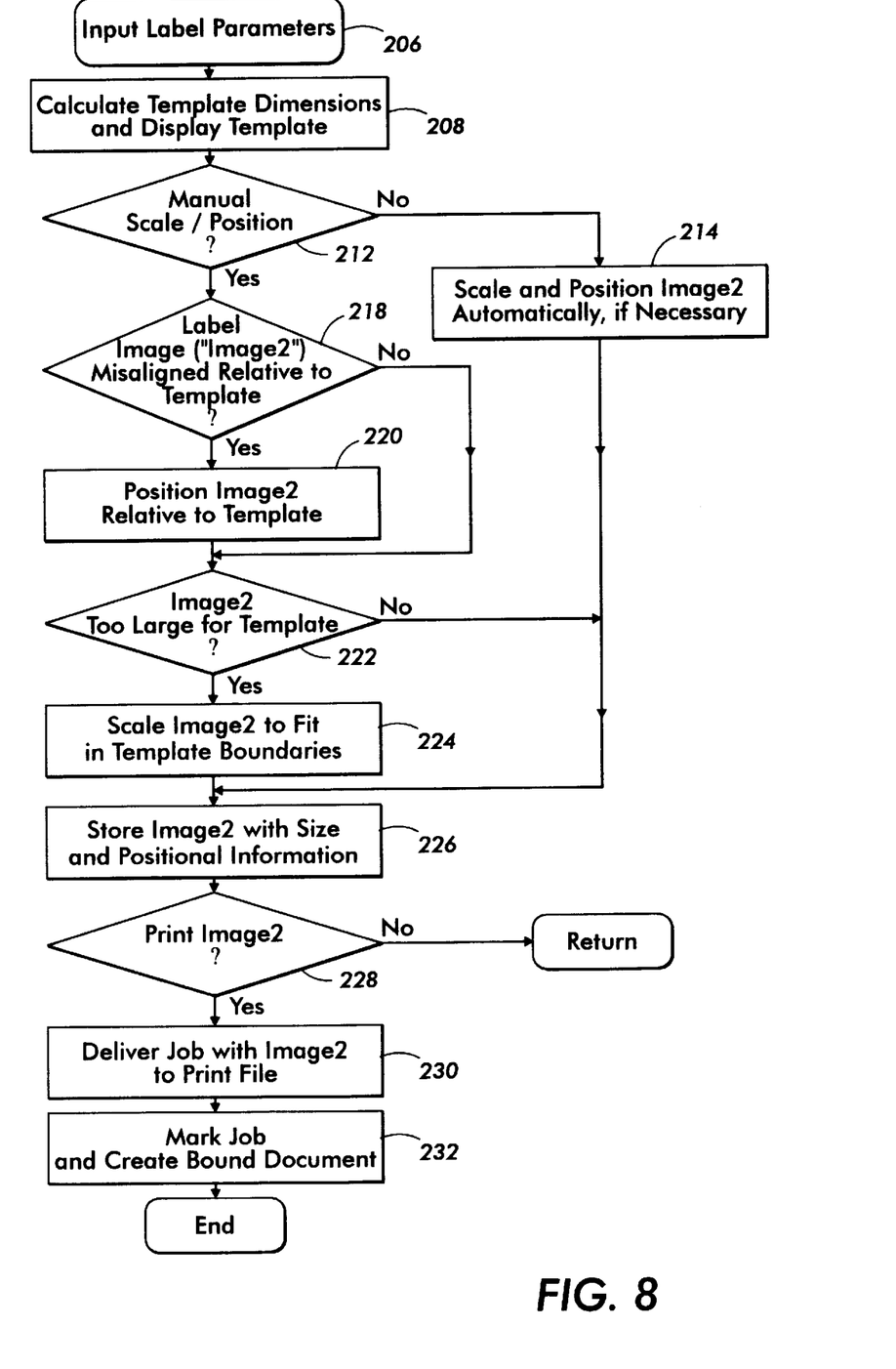
FIG. 8 is a flow diagram representing a technique for developing a cover label image ("Image2") for use in printing a spine label image ("Image 1")

To initiate the process of FIG. 8 (step 206), the parameters relating to the area for receiving Image1 are provided. These parameters can be obtained readily from information commonly stored with a corresponding job Using a suitable processor (step 208), the dimensions of a template, representing the receiving area for Image1, is calculated. Then using known display techniques, of the type disclosed by U.S. Pat. No. 5,450,541 to Rourke, the disclosure of which patent is incorporated herein by reference), a representation of the template, designated with the numeral 210, is displayed.

Figure 9:
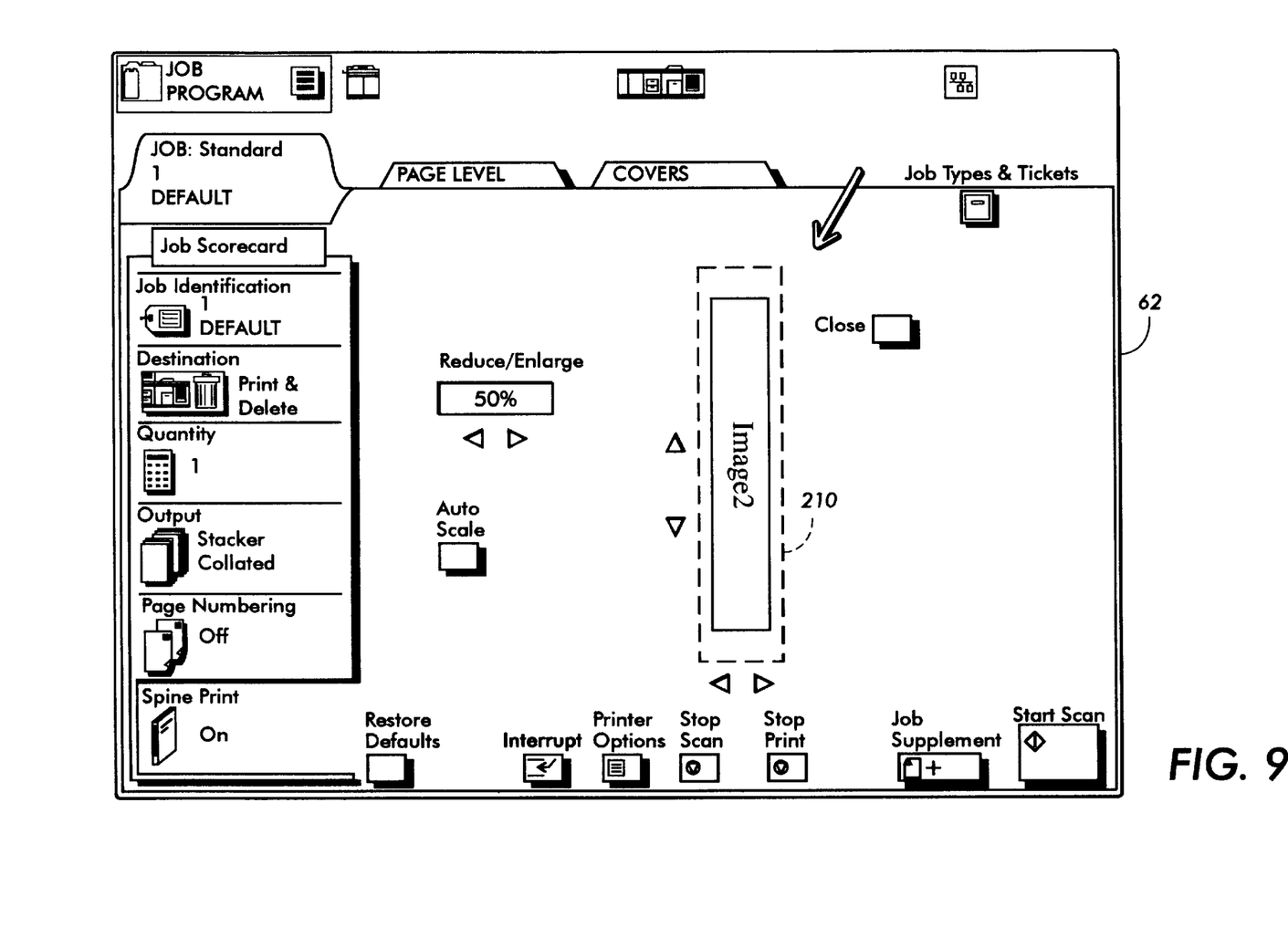
FIG. 9 is an elevational view of a dialog used in developing the cover label image.

Referring to FIGS. 8 and 9, the Image2 is shown as being disposed in the area of the template 210. In the example of FIG. 9, further processing of the Image2 is not required since Image2 fits within the template or image receiving area for Image1. The process of FIG. 8, however, provides the user with the option to manipulate the Image2. In particular, at step 212, the user is given the opportunity to manipulate the Image2 manually—even if the Image2 fits in the template, the user may desire to adjust the position or size of the corresponding image. Automatic image manipulation can be obtained by way of step 214, otherwise, the process proceeds to step 218. If the Image2 is misaligned relative to the template, then the user is provided with the option of positioning the image at step 220. As will appear, Image2 can, in one example, be misaligned relative to the scanhead by which the bound volume 200 is passed. If the Image2 is too large for the template (see step 222), then suitable scaling of the image is afforded at step 224. As shown in FIG. 9, scaling can be set by use of a suitable scaling control labeled "Reduce/Enlarge".

After Image2 has been appropriately manipulated, the job is stored (step 226) in memory for eventual printing. As demonstrated by step 228, the job associated with Image2 can be held for printing later or delivered to a print file for printing in the near future (step 230). In one example, the job is placed in a print queue, prior to delivery to the print file, and when the job reaches the top of the queue, it is marked in accordance with step 232. Subsequently, the marked job is delivered to a suitable finishing station for binding.

Figure 10A:
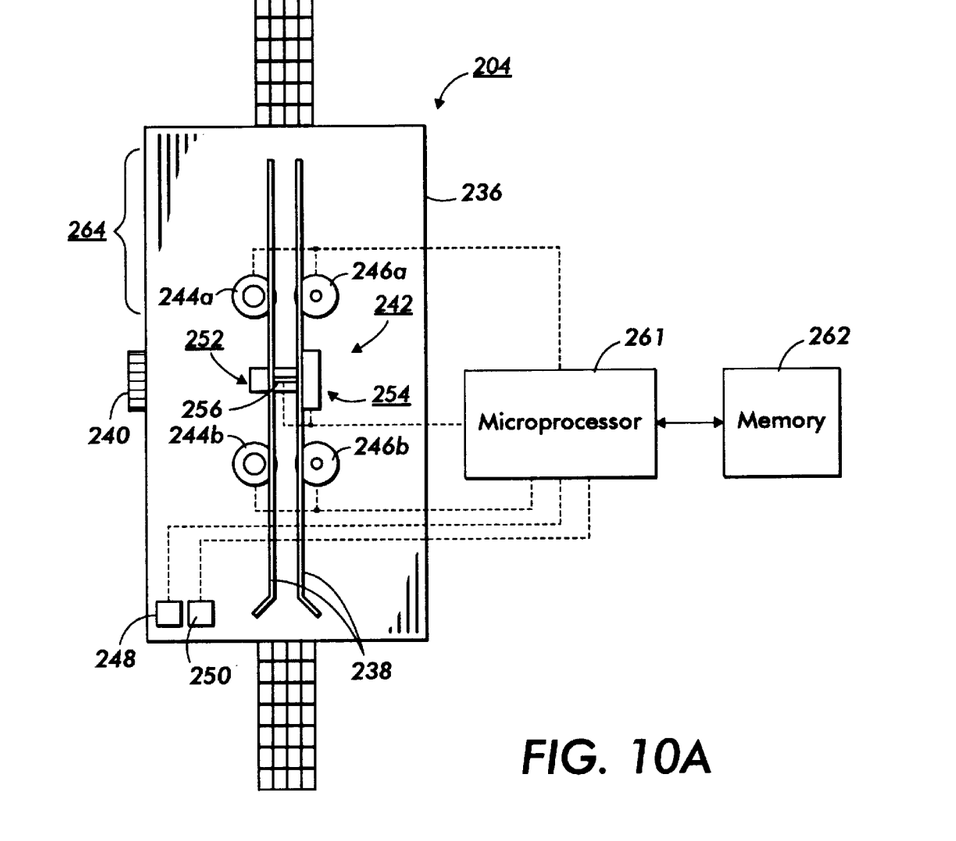
FIG. 10A is an overhead plan view of the spine printing apparatus of FIG. 7.
Figure 10B:
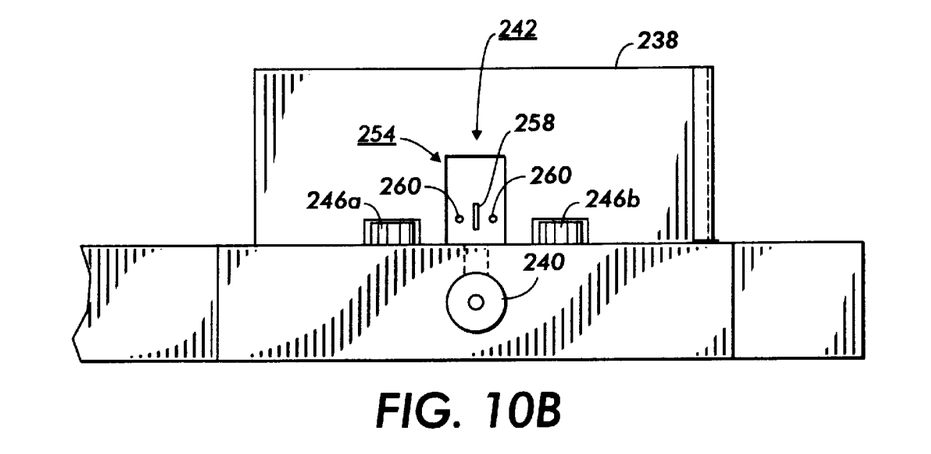
FIG. 10B is a side view of the spine printing apparatus of FIG. 7.

Referring to FIGS. 7, 10A and 10B, the spine printing apparatus 204 is discussed in further detail. The spine printing apparatus 204 includes a horizontal platform 236 for supporting a set of guide rails 238. The rails can be moved in one of two directions with an adjustment knob 240 for positioning the bound document 200. The bound document is driven past a scan/print system 242 by a first pair of drive wheels 244a, 244b and second pair of drive wheels 246a, 246b. Activation of the drive wheel pairs is controlled by a start button 248 and a stop button 250. The scan/print system 242 includes a print subsystem 252 disposed transversely of a scan subsystem 254. The print subsystem 252, in one example, includes a conventional "floating" printhead 256 with set of nozzles, from which ink is dispensed on demand, while the scan subsystem 254 includes an array of image capture elements (e.g. charge coupled devices) 258. The scan subsystem 254 further includes sensors 260, such as optical reflectance type sensors, the significance of which sensors will appear from the description below.

It will be appreciated by those skilled in the art that much of the functionality of the spine printing apparatus requires management by a conventional controller, such as a microprocessor of the type designated with a numeral 261 in FIG. 10A. It is contemplated that control of the drive wheels and the scan/print system would be achieved with the controller 261. Moreover, as will appear from the discussion below, in one example, buffering of image data is required to achieve the aim of the preferred embodiment—a suitable buffer or memory section is designated with the numeral 262.

Figure 11:
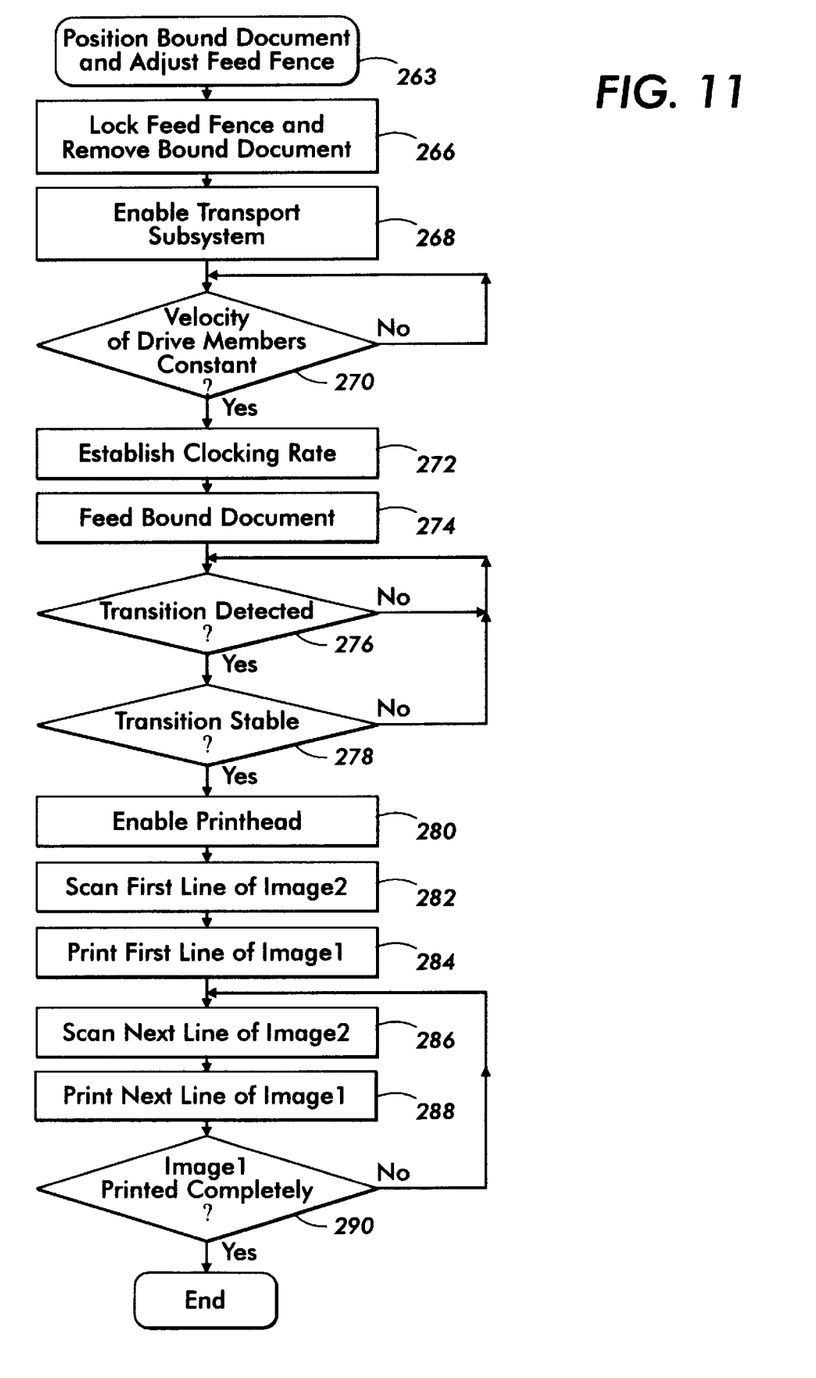
FIG. 11 is a flow diagram depicting a process for printing the representation of the cover label image on the spine of the bound document with the spine printing apparatus of FIG. 7.

Referring now to FIG. 11, operation of the spine printing apparatus shown in FIGS. 7, 10A and 10B will be discussed. Initially, the bound document 200 is positioned upstream of the scan/print system 242 (step 263 of FIG. 11) at location 264 (FIG. 10A) so that the guide rails 238 can be adjusted, with the knob 240, to support the document as it is fed to the drive wheels 244a and 246b. The guide rails are locked in place (step 266) and the bound document is removed from the spine printing apparatus. To proceed with marking of the spine, the start button 248 is pressed so that the drive wheels 244a, 244b, 246a and 246b begin to rotate (step 268). Once the velocity of the drive wheels is determined to be constant (step 270), a clock rate is established, at step 272, to enable the image capturing of Image2 and the marking of Image1 on the spine of the bound document 200.

Subsequent to, or near the time of, step 272, the bound document is urged toward the scan/print system 242 as a result of introducing the bound document to the rotating drive wheels 244a, 246a (step 274). Optical reflectance sensors 260 (FIG. 10B) are employed to determine when the spine of the bound document 200 is appropriately positioned over the printhead 256 (steps 276 and 278), and thus when the printhead should be enabled (step 280). As can be understood by those skilled in the art, a stable transition is sensed by the sensors when the bound document has passed by both of sensors 260. Determining that a transition sensed by the sensors corresponds with a consistent signal or transition ensures that the printhead is not inadvertently enabled.

After the bound document has triggered both sensors, the printhead 256 is enabled (step 280) and, at substantially the same time, the image capture elements 258 begin, via step 282, scanning the image 202 (FIG. 7), i.e. Image2. Subsequent to scanning a line of Image2, the line is, if necessary, buffered in the memory section 262 (FIG. 10A) for printing with the printhead 256, via step 284. As shown by steps 286, 288 and 290, scanning and printing proceed until a reproduction of Image2, namely Image 1, is completely printed on the spine of the bound document 200. As will be appreciated by those skilled in the art, as soon as Image2 passes by the sensors 260, another transition is detected and the printhead is accordingly disabled.

Numerous features of the above-described embodiment(s) will be appreciated by those skilled in the art. First, there is provided a relatively inexpensive spine printing apparatus which is easy to manufacture. In particular, the apparatus includes few complex mechanisms and the vital components of the apparatus, e.g. scan/print head, are easy to install.

Second, use of the device does not affect the printing rate of a group of bound volumes since the printing apparatus is separate from the printing system from which the bound documents are created.

Third, the printing apparatus is easy to use in that each bound document is automatically driven by the scan/print head.

Fourth, the printing apparatus need not be adjusted for purposes of printing a spine label image provided the source image from which the spine label image is created is appropriately sized. The sizing and positioning of the source image can be readily achieved with a suitably provided application. This application can be used at either the printing system from which the bound documents are created or an input station where a source job for the bound documents is developed.

In essence, the preferred embodiment provides a system in which a precreated label is quickly and easily printed on the spine of a bound volume. Since the precreated label is an integral part of the bound document, it is virtually guaranteed that a user will always obtain a desired spine label on a corresponding bound document spine.

Finally, with the printing apparatus of the preferred embodiment, the correct spine label is automatically applied to the bound document. Hence there is no opportunity for operator error resulting in application of the wrong spine label.

We claim:

1. A printing system for printing a representation of an image including a title on a spine of a bound document from an image disposed on a planar portion of the bound document, comprising:

a printing machine for storing an electronic document with an electronic image, and producing prints corresponding with the electronic document, wherein one of the prints includes the electronic image in the form of a printed image, said printing machine including,
   an image capture system for reading the printed image and converting the same to a set of image data,
   a printing device for using the set of image data to print the representation of the image on the spine of the bound document, and
   wherein at least a portion of the printed image is read with said image capture system concurrently with the representation of the image being printed on the spine of the bound document.

2. The printing system of claim 1, further comprising a bound volume positioning subsystem for positioning the bound document relative to both said image capture system and said printing device so that the at least portion of the printed image is read with said image capture system while the representation of the image is being printed on the spine.

3. The printing system of claim 1, further comprising an input station communicating with said printing machine, said input station being used to create the electronic document.

4. The printing system of claim 3, wherein said input station includes an image processing system for scaling the electronic image so that all of the printed image is readable by said image capture system.

\* \* \* \* \*